Dec. 10, 1929.  F. C. LEONARD  1,738,592
WELDING APPARATUS
Filed Dec. 8, 1925   2 Sheets-Sheet 2
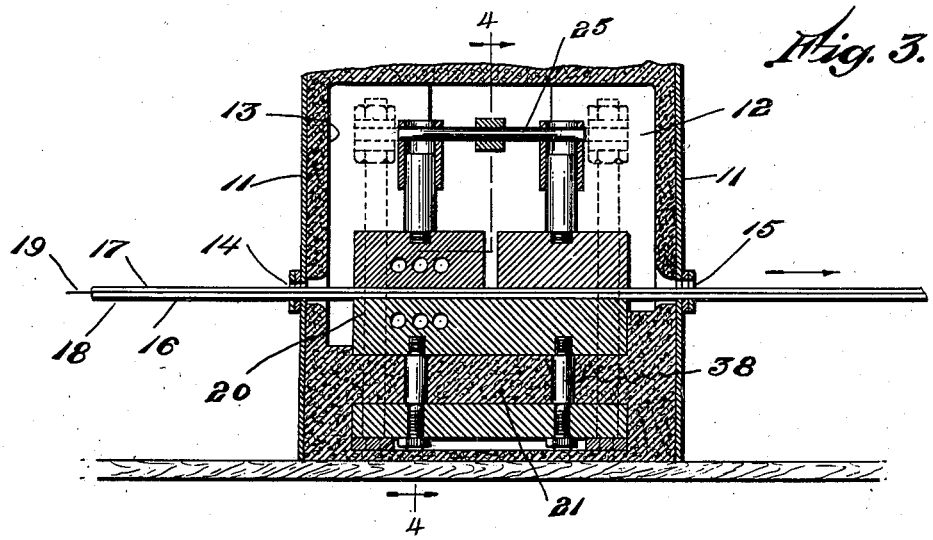
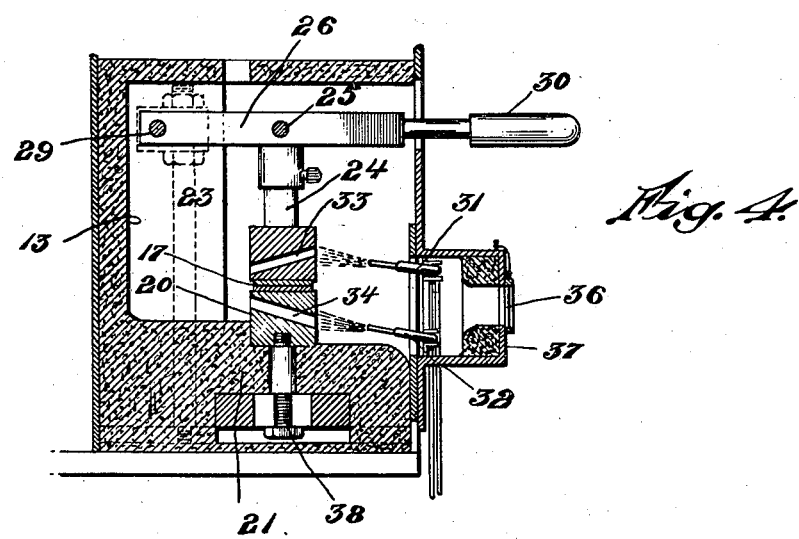
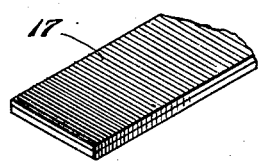
INVENTOR.
Frederick C. Leonard.
BY Barlow & Barlow
ATTORNEYS.

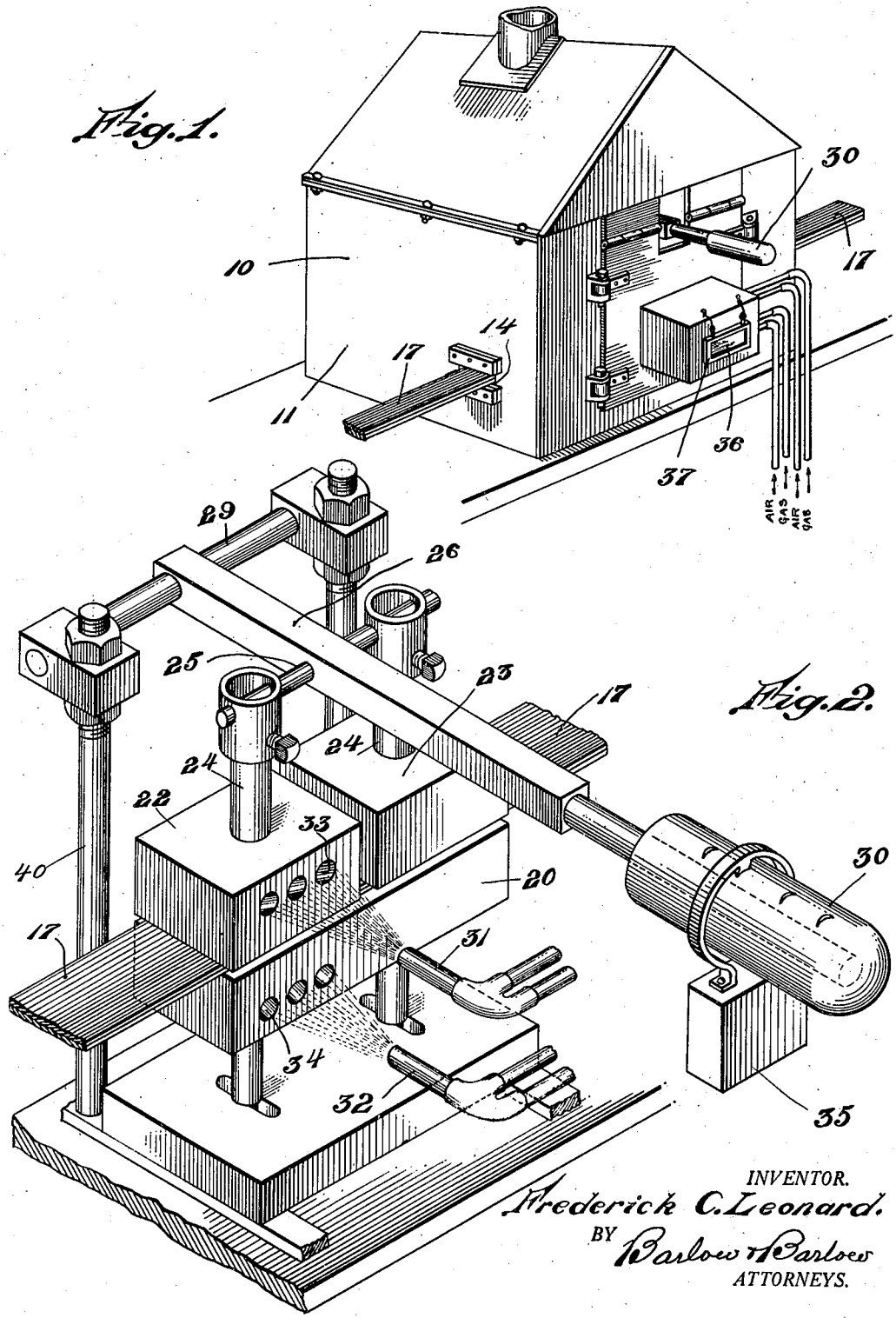

Patented Dec. 10, 1929

1,738,592

UNITED STATES PATENT OFFICE

FREDERICK C. LEONARD, OF PROVIDENCE, RHODE ISLAND, ASSIGNOR TO LEONARD-ROOKE CO., OF PROVIDENCE, RHODE ISLAND, A CORPORATION OF RHODE ISLAND

WELDING APPARATUS

Application filed December 8, 1925. Serial No. 74,143.

This invention relates to an improved construction of so-called welding furnace or apparatus; and has for its object to provide an apparatus of this character through which work may be progressively fed and treated by heat and pressure to weld or unite the parts of the work as it is passed therethrough.

A further object of this invention is the provision of a furnace having a heat chamber with entering and exit openings therein through which the work to be acted upon may be progressively fed, means being provided in the chamber for heating the work and means also being provided for applying pressure to the work.

A still further object of the invention is the provision of elements or members in the heating chamber by means of which pressure is applied to the work and through which a welding or fusing heat is transmitted to portions of the work being acted upon.

The invention further consists in the provision of a bed block and a presser block between which the work is passed, means being provided for moving one or both of these blocks to press the work between them and for heating the work while under such pressure, whereby the work may be acted upon by a progressive action.

With these and other objects in view, the invention consists of certain novel features of construction, as will be more fully described, and particularly pointed out in the appended claims.

In the accompanying drawings:

Figure 1 is a perspective view illustrating one form of my improved heating furnace having entering and exit openings therein through which the work may be fed while being progressively treated within the furnace.

Figure 2 is a perspective view illustrating the heating and pressure-applying blocks which may be located within the furnace chamber for treating the work by a step-by-step operation as fed therethrough.

Figure 3 is a sectional front elevation through the furnace and through the heating and pressure-applying blocks, showing the latter as acting upon the work which extends through the furnace from side to side thereof.

Figure 4 is a section on line 4—4 of Figure 3, showing the coverging heat-conducting openings through the presser blocks for equalizing the heat over their work-engaging surfaces.

Figure 5 shows a strip of composite metal, the elements of which have been welded or united together in my improved furnace.

It is found in practice in order to produce a long strip of composite metal of a length sufficient to be wound into a coil, or to be otherwise employed, that the furnace for welding or uniting the expandible and relatively non-expandible strips, in order to form a composite strip, should be in such form as to act progressively upon different portions of the metal, whereby the different coefficients of expansions of these different metals may be compensated for as the different sections or portions are welded or united together. Therefore, to produce a furnace which is adapted to progressively act upon these materials to produce the desired result, I have found it of advantage to provide a welding furnace having entering and exit openings therein through which the strip may be fed during the welding operation, whereby heat and a proper degree of pressure may be simultaneously applied to the metals to cause the same to be properly welded or united and to be cooled just sufficiently before the pressure is released permitting them to be sufficiently united to prevent separation at the joint; and the following is a detailed description of the present embodiment of my invention and showing one form of apparatus by which these advantageous results may be accomplished:—

With reference to the drawings, 10 designates one form of my improved welding furnace which is provided with opposite side walls 11 and of a heating chamber 12, which chamber is lined with a heavy layer of heat-resisting material 13, such as fire brick, asbestos or other suitable material.

In these side walls I have formed an entering opening through which may extend the work strip 16 as it is fed or advanced and progressively treated in the manner presently described, while passing through the furnace.

In this particular instance the work being treated comprises a strip 17 of expandible metal and a strip 18 of relatively non-expandible metal having a strip 19 of soldering material between them, which when subjected to heat in the chamber, the strip 19 is fused and the upper and lower strips 17 and 18 are forced by pressure which is applied thereto to be welded or united together. To accomplish this in a simple and effective way, I have provided an elongated bed block 20 which rests upon and is secured by bolts 38 to the base portion 21 in the furnace, the face of this bed block being in substantially the same plane as the lower edge of the entering and exit openings 14 and 15.

I have also provided a pair of presser blocks 22 and 23, each of which is provided with an upright 24 with a cross pin 25 which is engaged by the presser bar 26 pivoted on the rear fulcrum pin 29 supported by standards 40, the forward end of this bar being provided with an operating handle 30, whereby it may be manually operated to force the blocks 22 and 23 against the members of the composite strip to hold them firmly in contact and provide a heavy welding pressure during the welding or soldering operation.

The presser block 22 and a portion of the bed block 20 are herein shown as being heated with torches 31 and 32 which heat is forced against their front edges, and in order to equalize the heat over the working surface of each of these blocks, I have formed openings 33 in the upper block and openings 34 in the lower block, which openings converge rearwardly as they recede from the flame so as to direct the heat towards the working surfaces of the blocks as it emanates from the torches, by which means the rear surface of the heat-conducting presser blocks is brought up to substantially the same temperature as their forward edges against which the flame is projected.

It is found in some instances of advantage to provide a second presser block 23 not in contact with the flame, for the purpose of maintaining a pressure on the freshly soldered section of the work to prevent the parts from separating during the initial cooling and contracting action.

In some instances instead of exerting a pressure on the blocks by hand I may suspend a weight 35 from the handle 30 which may be adjusted along its length to provide the desired amount of pressure on the pressure blocks.

It is found in some instances of advantage to provide a peep hole or window 36 in the front door 37 of the furnace so as to be able to visably determine just when the solder has fused and begins to flow out from between the edges of the strips 17 and 18 being welded or united at which time the pressure may be released and the strip advanced to present a fresh section between the blocks to be similarly treated to the action of the heat and pressure.

By the use of my improved furnace, I am enabled to successfully weld, solder or unite strips of metal having widely different coefficients of expansions so that they will not separate at the joint, one form of this metal as so produced is described in detail in my co-pending patent application of even date herewith.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A welding apparatus comprising upper and lower pressing elements having parallel imperforate working surfaces for contacting with the work and between which the work to be treated may be progressively fed, means for intermittently applying heavy pressure through each of said elements to the work to be locally effective thereon, and means for transmitting welding heat during the application of welding pressure through each of said elements to the work to weld due to heat and pressure combined.

2. A welding apparatus comprising upper and lower pressing elements having parallel imperforate working surfaces for contacting with the work and between which the work to be treated may be progressively fed, means for intermittently applying heavy pressure through each of said elements to the work to be locally effective thereon, means for transmitting welding heat during the application of welding pressure through each of said elements to the work to weld due to heat and pressure combined, and means for equalizing the heat in said elements over their work engaging surfaces.

3. A welding apparatus comprising a heating chamber having diametrically opposite openings therein through which work to be treated may be fed, upper and lower pressing elements in said heating chamber having parallel imperforate working surfaces for contacting with the work and between which the work to be treated may be progressively fed, means for applying heavy pressure intermittently through each of said elements to the work to be locally effective thereon, and means for transmitting welding heat during the application of welding pressure through each of said elements to the work to weld due to heat and pressure combined.

4. A welding apparatus comprising a heating chamber having diametrically opposite openings therein through which work to be treated may be fed, upper and lower pressing elements in said heating chamber having parallel imperforate working surfaces for contacting with the work and between which the work to be treated may be progressively fed, means for applying heavy pressure intermittently through each of said elements to the work to be locally effective thereon, means for transmitting welding heat during the application of welding pressure through each of said elements to the work to weld due to heat and pressure combined and means for equalizing the heat in said elements over their work engaging surfaces.

5. A welding apparatus comprising a heating chamber having diametrically opposite openings through which a strip of work may be fed, a bed block in said chamber, a presser block mounted for movement relative to said bed block, said blocks having imperforate working surfaces for parallel engagement with the work and between which the work to be treated may be progressively fed, means for applying heavy pressure intermittently through each of said blocks to the work to be locally effective thereon, and means for transmitting welding heat during the application of welding pressure through each of said elements to the work to weld due to heat and pressure combined.

6. A welding apparatus comprising a heating chamber having diametrically opposite openings through which a strip of work may be fed, a bed block in said chamber, a presser block mounted for movement relative to said bed block, said blocks having imperforate working surfaces for parallel engagement with the work and between which the work to be treated may be progressively fed, means for applying heavy pressure intermittently through each of said blocks to the work to be locally effective thereon, and means for transmitting welding heat during the application of welding pressure through each of said elements to the work to weld due to heat and pressure combined, each of said blocks being provided with heat conducting openings conveying towards the working surfaces of said blocks.

7. A welding apparatus comprising a heating chamber having diametrically opposite openings through which a strip of work may be fed, a bed block in said chamber adjustably mounted therein, a presser block mounted for movement relative to said bed block, said blocks having imperforate working surfaces for parallel engagement with the work and between which the work to be treated may be progressively fed, means for applying heavy pressure intermittently through each of said blocks to the work to be locally effective thereon, and means for transmitting welding heat during the application of welding pressure through each of said elements to the work to weld due to heat and pressure combined.

In testimony whereof I affix my signature.

FREDERICK C. LEONARD.